UNITED STATES PATENT OFFICE.

ROBERT Y. GREGG, OF PORTALES, TERRITORY OF NEW MEXICO.

HARVESTER.

936,121.  Specification of Letters Patent.  Patented Oct. 5, 1909.

Application filed March 4, 1907. Serial No. 360,433.

*To all whom it may concern:*

Be it known that I, ROBERT Y. GREGG, a citizen of the United States, residing at Portales, in the county of Roosevelt, Territory of New Mexico, have invented certain new and useful Improvements in Harvesters; and I do hereby declare the following to be a full, clear, and exact description of the invention, such as will enable others skilled in the art to which it appertains to make and use the same.

This invention relates to harvesters and more particularly to that class which are designed for use in harvesting kafir, maize, etc., and which have vertically adjustable knives for cutting the grain at any desired height.

One of the features of my invention resides in the manner of mounting these knives and of adjusting them vertically, the said adjusting means being operable from a point within easy reach of the operator of the machine.

Broadly speaking the mechanism for raising and lowering the knives consists of a frame including vertical rods upon which are slidably mounted sleeves which form a portion of a bracket, which bracket has a step bearing for a squared shaft, which is journaled in the frame and is movable through the instrumentality of the bracket in the frame, the knives being carried by the shaft above the bracket or rather directly upon a portion of the same and being of course movable vertically with the shaft.

Figure 1:
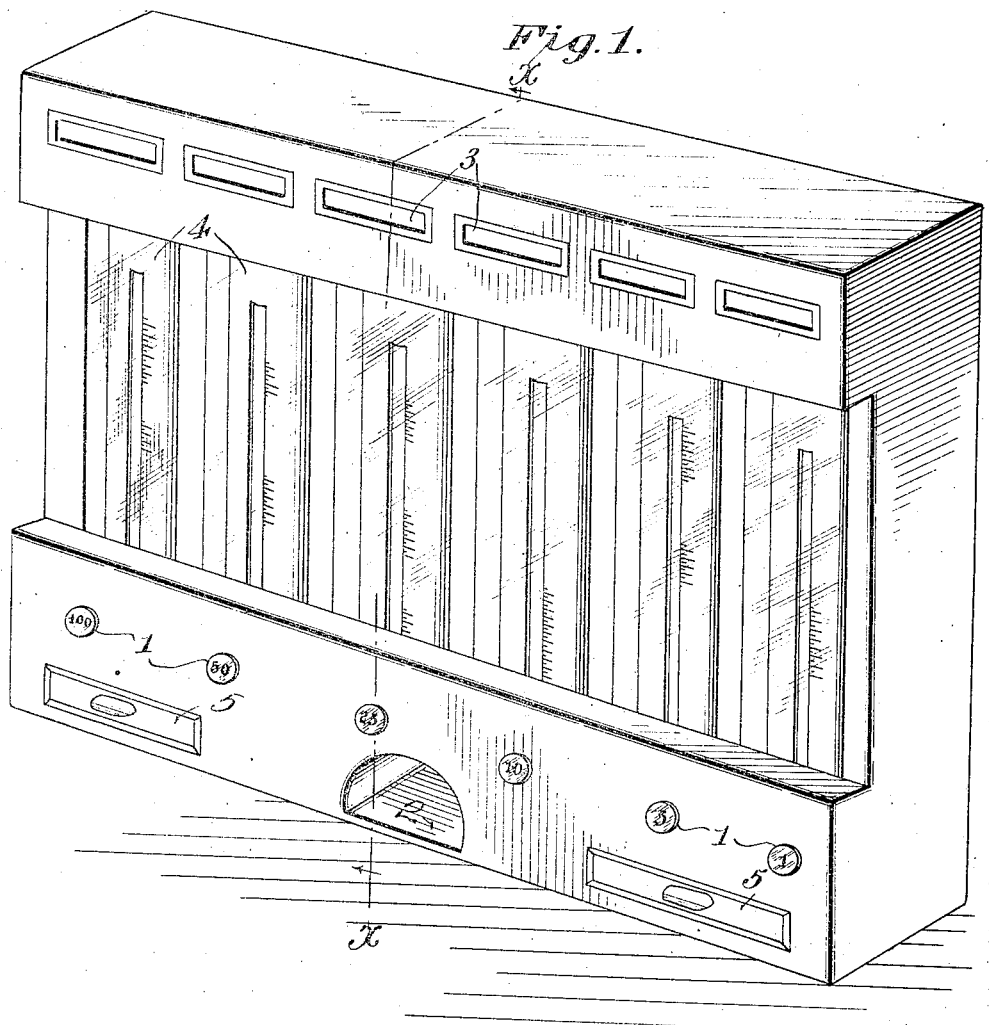
Figure 2:
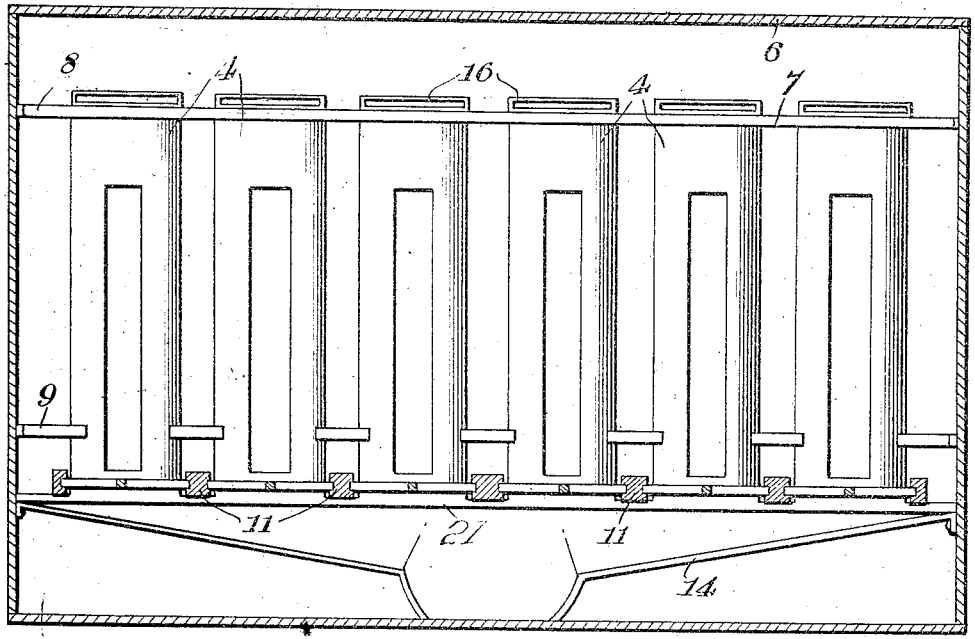
Figure 3:
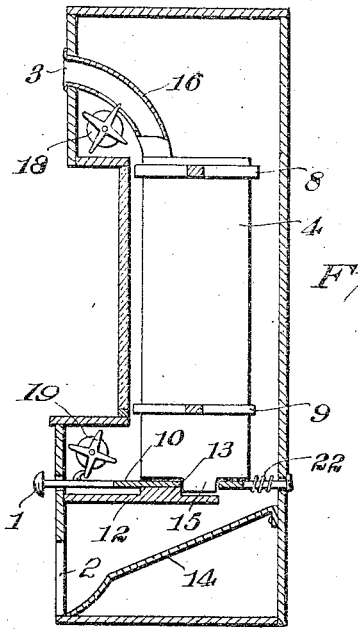

In the accompanying drawings, Figure 1 is a side elevation of the machine looking in one direction, Fig. 2 is a similar view of the opposite side of the machine, Fig. 3 is a rear elevation of the machine, Fig. 4 is a front elevation thereof, Fig. 5 is a top plan view, Fig. 6 is a vertical longitudinal sectional view, Fig. 7 is a detail vertical transverse sectional view showing the manner of mounting one of the blades, Fig. 8 is a detail view of the guide member for guiding the corn stalk to the knives, and, Fig. 9 is a detail view of one of the disk knives.

Referring more specifically to the drawings the machine is shown as comprising a frame including side sills 10 which are connected at their front end by means of a cross rod 11, and supportetd upon the under side of the frame by an axle 12 at each end of which is journaled a ground wheel 13 carrying a crown gear 14 formed integral with which is a pulley 15 the pulley being located upon the side of the crown gear adjacent the ground wheel.

Supported at their forward ends by the side sills 10 of the frame are the side-boards 16 of a conveyer and journaled at the forward ends of these boards is a shaft 17 and at the rear end thereof a shaft 18, there being rollers 19 and 20 respectively secured upon these shafts and the belt 21 of the conveyer is arranged for travel over these rollers and is provided with the usual transversely extending slats 22. The side sills 10 of the frame are turned upwardly at their rear ends as at 23. The ground wheel 25 which is of less diameter than the ground wheels 13, is journaled in a suitable bracket 26 upon the under side of the conveyer above described at the extreme forward end thereof.

Engaged over the pulley 15 is a belt 27 which extends around a pulley 28 located at one end of the shaft 18, this belt being crossed so that when the machine is traveling forward the upper stretch of the belt conveyer 21 will travel rearwardly for a purpose which will presently be apparent.

A bar 29 is secured at one of its ends to each of the side boards 16 and extends forwardly beyond the forward end of the side board and is then turned to extend upwardly as at 30 and outwardly to support a plate 31 it being understood of course that there are two such plates, one being supported by each of the bars 29. Secured at their lower ends to these plates 31 are pairs of vertically extending guide rods 32 which support at their upper ends and directly above the plates 31, plates 33. These plates 33 however project inwardly toward each other to a greater extent however than the plates 31 and have their inner ends bent upwardly at right angles as at 34 and provided with openings for the engagement therethrough of the threaded ends of a tie rod 35 upon the said ends of which are engaged nuts 36 which bear against the outer faces of the upturned portions 34 of the plates and serve together with the said rods to brace the said plates and their connected parts in proper relation. The guide rods 32 serve to support for vertical movement a frame which comprises a narrow plate 37 which is bent ment with keepers 79 upon the sides of the box when the bottom is closed and pivotally connected to the bottom is the rear end of a connecting rod 80 which leads to and is pivotally connected with the lower end of a lever 81 as indicated at 82, the said lever being adapted to coöperate in the segmental rack 83 whereby it may be held in any desired position to support the bottom of the grain box either in its entirely open or closed position or at some point mid-way thereof.

A bracket 84 extends from one of the side-boards 16 and serves as a bearing for one end of a shaft 85, there being a secondary bracket carried by the bracket 84 and indicated by the numeral 86 for supporting the opposite end portion of the shaft. A frame 87 is loosely connected at one of its ends with this shaft and is supported adjacent its middle by a bracket 88 which is carried by the other of the side sills 16 of the main conveyer frame it being understood of course that the frame 87 extends transversely of the main conveyer frame. A roller 89 is carried by the shaft 85 and a shaft 90 which is journaled at the extreme end of the frame 87 carries a roller 91 and over these rollers 89 and 91 is engaged an endless conveyer belt 92 which is adapted to receive stalks as they are discharged from the conveyer belt 21 and convey them either into a wagon which travels along side of the machine or to deposit them along the ground. A pulley 93 is carried by the shaft 18 near one end adjacent to the pulley 28 and a belt 95 connects the pulley 93 with a pulley 94 carried by the adjacent end of the shaft 85.

From the foregoing description of my invention it will be observed that as the corn stalks are topped their tops are deposited upon the main conveyer belt 21 and are carried to and deposited upon the conveyer belt 92 and that the cutting elements of the machine may be adjusted to any desired degree either in unison or independently of each other.

From an inspection of Figs. 5 and 6 it will be noted that the longitudinal conveyer is spaced a short distance from the transverse conveyer and any grain which may become detached from the ears will fall through this space into the box 76 which is so positioned that its rear wall is to the rear of the conveyer apron as it moves around the member 20.

What is claimed, is—

1. In a header, a wheeled supporting frame, an upwardly and rearwardly inclined conveyer mounted thereon, a guard extending across the lower end of the conveyer, cutting apparatus mounted on opposite sides of the conveyer, and means for guiding the severed heads onto the conveyer.

2. In a header, a wheeled supporting frame, a conveyer mounted thereon, a guard extending across the receiving end of the conveyer, cutting apparatus mounted on opposite sides of the conveyer, and means for guiding the severed heads onto the conveyer.

3. In a header, a wheeled supporting frame, a conveyer mounted thereon, a guard extending across the receiving end of the conveyer, cutting apparatus mounted on opposite sides of the conveyer, means for adjusting the height of said cutting apparatus, and means for guiding the severed heads onto the conveyer.

4. In a header, a wheeled supporting frame, a conveyer mounted thereon, a guard extending across the receiving end of the conveyer, cutting apparatus mounted on opposite sides of the conveyer, means for independently adjusting each of said cutting apparatus, and means for guiding the severed heads onto the conveyer.

5. In a header, a wheeled supporting frame, a conveyer mounted thereon, a guard extending across the receiving end of the conveyer, cutting apparatus mounted on opposite sides of the conveyer, and a curved plate for guiding the severed heads onto the conveyer.

6. In a header, a wheeled supporting frame, a conveyer mounted thereon, a guard extending across the receiving end of the conveyer, cutting apparatus mounted on opposite sides of the conveyer, means for independently adjusting each of the cutting apparatus, and a curved plate for guiding the severed heads onto the conveyer.

In testimony whereof, I affix my signature, in presence of two witnesses.

ROBERT Y. GREGG.

Witnesses:
L. B. GREGG,
C. W. MORRIS.

C. A. GRIMM.
COMBINED CASH REGISTER AND MONEY CHANGER.
APPLICATION FILED JAN. 11, 1909.

936,122.

Patented Oct. 5, 1909.
3 SHEETS—SHEET 1.

Witnesses

Inventor
C. A. Grimm,
By ........, Attorneys

C. A. GRIMM.
COMBINED CASH REGISTER AND MONEY CHANGER.
APPLICATION FILED JAN. 11, 1909.
936,122.
Patented Oct. 5, 1909.
3 SHEETS—SHEET 3.
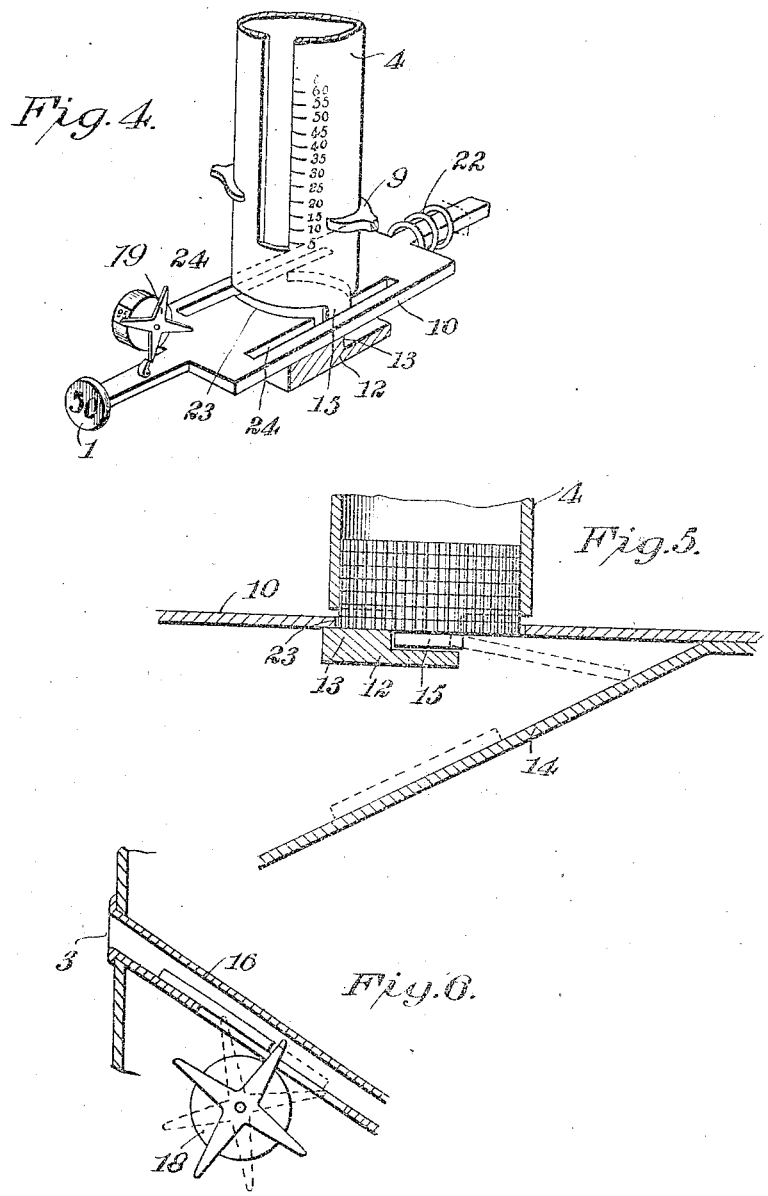
Witnesses
Inventor
C. A. Grimm,
By
Attorneys